US007316492B2

(12) United States Patent
Yamamura et al.

(10) Patent No.: US 7,316,492 B2
(45) Date of Patent: *Jan. 8, 2008

(54) VEHICLE HEADLAMP

(75) Inventors: Satoshi Yamamura, Shizuoka (JP); Shinji Kagiyama, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 182 days.

This patent is subject to a terminal disclaimer.

(21) Appl. No.: 11/094,309

(22) Filed: Mar. 31, 2005

(65) Prior Publication Data

US 2005/0219858 A1 Oct. 6, 2005

(30) Foreign Application Priority Data

Mar. 31, 2004 (JP) ........................ P. 2004-106211

(51) Int. Cl.
*B60Q 1/04* (2006.01)
*B60Q 1/00* (2006.01)

(52) U.S. Cl. ...................... 362/539; 362/512; 362/549

(58) Field of Classification Search ................ 362/282, 362/284, 322, 324, 346, 351, 512, 514, 518, 362/519, 538, 539, 548, 549
See application file for complete search history.

(56) References Cited

U.S. PATENT DOCUMENTS

| | | | | |
|---|---|---|---|---|
| 4,677,532 | A * | 6/1987 | Peitz et al. | 362/518 |
| 6,210,028 | B1 * | 4/2001 | Murakoshi et al. | 362/538 |
| 6,994,460 | B2 * | 2/2006 | Yamamura | 362/538 |
| 7,090,385 | B2 * | 8/2006 | Sugimoto | 362/539 |
| 2005/0225995 | A1 * | 10/2005 | Komatsu et al. | 362/512 |

FOREIGN PATENT DOCUMENTS

| | | |
|---|---|---|
| JP | 2-47704 U | 4/1990 |
| JP | 2001-229715 A | 8/2001 |
| JP | 2003-257218 A | 9/2003 |

* cited by examiner

*Primary Examiner*—Y. My Quach-Lee
(74) *Attorney, Agent, or Firm*—Sughrue Mion Pllc.

(57) ABSTRACT

There is provided a movable shade which can move between a light shielding position and a light shielding moderating position, so that a single lamp can be used both for low beam and high beam. Then, the longitudinal length of the lamp is shortened so as to attempt to make the lamp compact in size by inserting a light source bulb into a reflector from a side of an optical axis Ax. As this occurs, the insertion and fixing of the light source bulb is implemented at a position which is apart downwardly from the optical axis, whereby the formation of a light source bulb inserting and fixing hole in optical axis sideways areas on a reflecting surface of the reflector is avoided which would otherwise have to occur.

7 Claims, 9 Drawing Sheets

VEHICLE HEADLAMP

The present application claims foreign priority based on Japanese Patent Application No. P.2004-106211, filed Mar. 31, 2004, the contents of which are incorporated herein by reference.

BACKGROUND OF THE INVENTION

The present invention relates to a projector type vehicle headlamp and more particularly to a vehicle headlamp having a movable shade.

In general, projector type vehicle headlamps are constructed such that a projection lens is disposed on an optical axis which extends in a longitudinal direction of a vehicle and a light source is disposed rearward of a rear focal point of the projection lens, whereby light from the light source is reflected by a reflector so as to converge towards the optical axis. In order to form a low beam light distribution pattern by the projector type vehicle headlamp, the reflected light from the reflector is partially shielded by a shade which is disposed such that an upper edge thereof is situated in the vicinity of the optical axis near the rear focal point of the projection lens, so that a predetermined cut-off line is formed at an upper end portion a low beam light distribution pattern.

In the above projector type vehicle headlamps, JP-A-2003-257218 discloses a projector type vehicle headlamp having, as the shade, a movable shade which is made to move to a light shielding moderating position where a shielding amount of the reflected light shielded by the shade is reduced.

In addition, JP-U-02-047704 and JP-A-2001-229715 disclose projector type vehicle headlamps in which a light source is made up of a light emitting portion of a light source bulb which is inserted into a reflector from a side of an optical axis so as to be fixed in place therein. That is, a so-called sideways insertion type lamp construction.

In the vehicle headlamp described in JP-A-2003-257218, since a high beam light distribution pattern can be formed by moving the movable shade to the light shielding moderating position, the single lamp can be used both for low beam and highbeam. In the vehicle headlamp described JP-A-2003-257218, however, since the light source bulb is inserted into the reflector from the rear thereof on the optical axis so as to be fixed in place therein, the longitudinal length of the headlamp becomes long and this makes it difficult to secure a space where the headlamp is assembled in a vehicle.

To cope with this, in case a sideways insertion type lamp construction such as described in JP-U-02-047704 and JP-A-2001-229715 is adopted in the projector type vehicle headlamp having the movable shade, the longitudinal length of the headlamp can be shortened, thereby making it possible to attempt to make the headlamp compact.

In the vehicle headlamps described in JP-U-02-047704 and JP-A-2001-229715, however, since the light source bulb is inserted into the reflector so as to be fixed in place therein on the same horizontal plane as that of the optical axis, the following problem emerges.

Namely, the projector type vehicle headlamp is suitable for forming a diverging area of the light distribution pattern, however, since a light source bulb inserting and fixing hole is formed in an optical axis sideways area when the light source bulb is inserted into the reflector so as to be fixed in place therein on the same horizontal plane as that of the optical axis, the relevant optical axis sideways area cannot be used effectively to control the light distribution. Thereby, there is caused a problem that sufficient brightness cannot be ensured for the diverging area of the light distribution pattern.

SUMMARY OF THE INVENTION

The invention was made in view of the situations and an object thereof is to provide a projector type vehicle headlamp having a movable shade in which sufficient brightness can be ensured for the diverging area of the light distribution pattern even when the sideways insertion type lamp construction is adopted.

According to the invention, the object is attempted to be achieved by devising the arrangement of a light source bulb.

Namely, according to the invention, there is provided a vehicle headlamp comprising a projection lens disposed on an optical axis extending in a longitudinal direction of a vehicle, a light source disposed rearward of a rear focal point of the projection lens, a reflector for reflecting light from the light source in such a manner as to converge towards the optical axis and a shade for partially shielding the reflected light from the reflector, wherein the shade is made as a movable shade which can move between a light shielding position where the shade is disposed such that an upper edge thereof is positioned in the vicinity of the optical axis near the rear focal point and a light shielding moderating position where a shielding amount of a light shielded by the shade is made smaller than when the shade is at the light shielding position. In the vehicle headlamp, the light source is made up of a light emitting portion of a light source bulb which is inserted into the reflector from a side of the optical axis at a position apart downwardly from the optical axis so as to be fixed in place therein and is positioned below the optical axis.

The type of the "light source" is not limited particularly, and for example, a discharged light emitting portion of a discharge bulb or a filament of a halogen bulb can be adopted. In addition, there is specified no limitation value for the downward displacement of the light source, provided that the "light source" is situated below the optical axis.

The form of the movement of the "movable shade" is not limited particularly, and for example, a rectilinear reciprocating motion or rotating motion can be adopted.

While it goes without saying that the concept of "side the optical axis" includes a horizontal direction which intersects with the optical axis at right angles, directions are included in the concept of "side of the optical axis", in the event that the deviation thereof relative to the horizontal direction which intersects with the optical axis at right angles is in the range of 30° or smaller.

As is illustrated in the aforesaid construction, since the vehicle headlamp of the invention has the movable shade which can move between the light shielding position and the light shielding moderating position, the single lamp can be used both for low beam and high beam. In addition, while the vehicle headlamp according to the invention is made as the projector type vehicle headlamp, since the light source bulb is inserted into the reflector from the side of the optical axis which extends in the longitudinal direction of the vehicle so as to be fixed in place therein, the longitudinal length of the headlamp can be shortened to thereby attempt to make the headlamp compact.

As this occurs, since the insertion and fixing of the light source bulb is performed at the position apart downwardly from the optical axis, it is possible to avoid the formation of the light source bulb inserting and fixing hole in the optical axis sideways area on the reflecting surface of the reflector, whereby the optical axis sideways area can be used effectively to control the light distribution. In addition, since the light source is situated below the optical axis, it can be made difficult that light from the light source which is reflected at areas on the reflecting surface of the reflector which are in the vicinity of the optical axis is shielded by the light source bulb. Consequently, the diverging area of the light distribution pattern can be formed by reflected light from the optical axis sideways areas on the reflecting surface of the reflector both in a low beam light distribution pattern and a high beam light distribution pattern, whereby sufficient brightness can be ensured for the diverging area.

Thus, according to the invention, in the projector type vehicle headlamp having the movable shade, even in the event that the sideways insertion type lamp construction is adopted, sufficient brightness can be ensured for the diverging area of the light distribution pattern.

In the above construction, while there is specified no limitation on the construction of the light source, in the event that the light source is made as a linear light source which extends in a bulb center axis direction of the light source bulb, the following function and advantage can be obtained.

Namely, in the projector type vehicle headlamp having the movable shade, many portions of a low beam light distribution pattern and a high beam light distribution which are formed by light emitted from the headlamp are formed by reflected light from the same reflecting area of the reflector. As this occurs, in the low beam light distribution pattern and the high beam light distribution pattern, since hot zones, which are high luminous intensity areas of the light distribution patterns, are situated in a direction substantially square to a front surface of the headlamp, it is appropriate to use reflected light from a rearward area of the reflecting surface of the reflector along the optical axis for the formation of the hot zones.

As this occurs, in the event that the light source is made as the linear light source which extends in the optical axis direction, since an inverted projected image of the light source that is formed by reflected light from the rearward area of the reflecting surface along the optical axis is formed into substantially a vertically elongated rectangular shape which extends longer in a vertical direction, in case the inverted projected image is made to be formed in the direction square to the front surface of the headlamp, a lower end portion of the inverted projected image is formed as a bright image in the near field area on the road surface in front of the vehicle, this facilitating the generation of irregular light distribution on the road surface in front of the vehicle.

On the contrary to this, in the event that the light source is made as the linear light source which extends in the optical axis direction, since an inverted projected image of the light source that is formed by reflected light from the rearward area of the reflecting surface along the optical axis is formed into substantially a horizontally elongated rectangular shape which extends longer in a horizontal direction, even in case the inverted projected image is made to be formed in the direction square to the front surface of the headlamp, it is possible to suppress effectively the generation of large irregular light distribution on the road surface in front of the vehicle by the inverted projected image.

According to the invention, since the light source is situated below the optical axis, and the movable shade is disposed such that the upper edge thereof is positioned in the vicinity of the optical axis near the rear focal point of the projection lens when located at the light shielding position, it is possible to prevent most of the direct light from the light source from entering the projection lens.

As this occurs, in case the shade is made to intersect with a straight line which connects the light source with an upper edge of an opening in a rear side of the projection lens whether the shade is located at the light shielding position or the light shielding moderating position, it can be ensured that the direct light from the light source is prevented from entering the projection lens, whereby the light distribution control for forming the low beam light distribution pattern and the high beam light distribution pattern can be implemented with good accuracy.

In the above construction, while it is true, as has been described above, that there is specified no limitation value for the downward displacement of the light source relative to the optical axis, from the viewpoint of preventing the light from the light source which has been reflected on the areas on the reflecting surface of the reflector which are in the vicinity of the optical axis from being shielded by the light source bulb, it is preferable to set the downward displacement to a value of 10 mm or larger and is more preferable to set the same displacement to a value of 15 mm or larger. On the other hand, from the viewpoint of ensuring a sufficient incident luminous flux which is incident on the reflecting surface of the reflector, it is preferable to set the downward displacement to a value of 30 mm or smaller.

In the above construction, in case an upper reflecting area of the reflecting surface of the reflector is set as a reflecting area for forming a diverging light distribution pattern, sufficient leftward and rightward transverse divergent angles can be given to the low beam light distribution pattern and the high beam light distribution pattern. In addition, in case a transversely central area of a lower reflecting area where the incident luminous flux of the light source bulb on the reflecting area of the reflector takes a large value is set as a reflecting area for forming a converging light distribution pattern, the formation of hot zones, which constitute the high luminous intensity areas of the low beam light distribution pattern and the high beam light distribution pattern, can be facilitated. Here, the "diverging light distribution pattern" means a light distribution pattern which has a relatively large divergent angle, and the "converging light distribution pattern" means a light distribution pattern which has a relatively small divergent angle.

In the above construction, while it goes without saying that the insertion and fixing of the light source bulb relative to the reflector may be performed in the horizontal plane, in case the insertion and fixing of the light source bulb relative to the reflector is performed in a state where the light source bulb is inclined upwardly at a predetermined angle relative to the horizontal direction, since a light source bulb inserting and fixing hole which is to be formed in the reflecting surface of the reflector can be lowered, the optical axis sideways areas on the reflecting area can be used widely to control the light distribution. As this occurs, while there is specified no particular limitation on the magnitude of the "predetermined angle", it is preferable to set the same angle to a value of 30° or smaller, and it is more preferable to set the angle to a value of on the order of 15° or smaller.

In the above construction, while there is specified no particular limitation on the material of the "projection lens", in case the projection lens is made up of a synthetic resin lens, the projection lens can be attempted to be made light in weight and inexpensive in cost when compared with a case where the projection lens is made of glass.

Note that even in case the projection lens is made up of a synthetic resin lens as has been described above, the projection lens can be made to resist easy thermal deformation from the following reasons.

Namely, as has been described above, according to the invention, since the light source is situated below the optical axis, and the movable shade is disposed such that the upper edge thereof is positioned in the vicinity of the optical axis near the rear focal point of the projection lens when located at the light shielding position, it is possible to prevent most of the direct light from the light source from entering the projection lens. Consequently, even in the event that the projection lens is made up of the synthetic resin lens, the projection lens can be made to resist easy thermal deformation from the following reasons.

As this occurs, as has been described above, since in case the shade is made to intersect with the straight line which connects the light source with the upper edge of the opening in the rear side of the projection lens whether the shade is located at the light shielding position or the light shielding moderating position, it can be ensured that the direct light from the light source is prevented from entering the projection lens, the thermal deformation of the projection lens can be suppressed more effectively.

In addition, in the event that the light source is made as the linear light source which extends in the bulb center axis direction, positions where reflected light from respective points on the reflecting surface of the reflector is incident on the projection lens within a vertical sectional plane including the optical axis can easily be caused to deviate vertically from one another so that the points do not overlap one another, whereby a local increase in temperature of the projection lens can be prevented. Consequently, even in the event that the projection lens is made up of the synthetic resin lens, the generation of thermal deformation can effectively be suppressed.

BRIEF DESCRIPTION OF THE DRAWINGS

FIGS. 4A and 4B are perspective views showing light distribution patterns formed on an imaginary screen disposed at a position 25 m ahead of the vehicle headlamp by light emitted forward from the headlamp, in which FIG. 4A shows a low beam light distribution pattern, and FIG. 4B shows a high beam light distribution pattern.

DESCRIPTION OF THE PREFERRED EMBODIMENTS

An embodiment of the invention will be described below by reference to the accompanying drawings.

Figure 1:
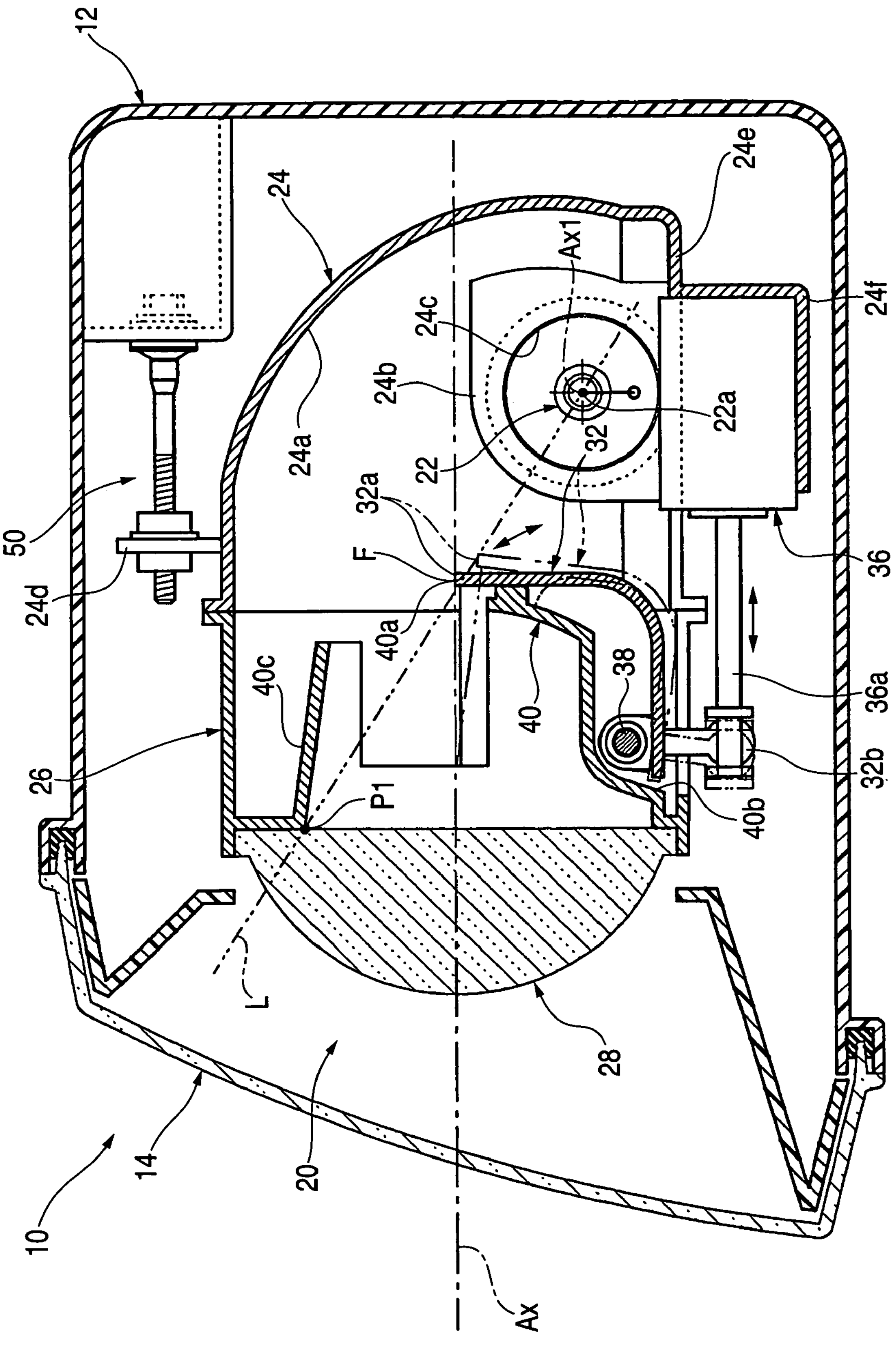
FIG. 1 is a sectional side view illustrating a vehicle headlamp according to an embodiment of the invention.

FIG. 1 is a sectional side view showing a vehicle headlamp 10 according to an embodiment of the invention.

As is shown in the drawing, the vehicle headlamp 10 is such that a lamp unit 20 having an optical axis Ax extending a longitudinal direction of a vehicle is accommodated in such a manner as to be inclined vertically and transversely via an aiming mechanism 50 within a lamp compartment defined by a lamp body 12 and a clear transparent cover 14 attached to a front end opening in the lamp body 12.

Then, in a step where an aiming adjustment by the aiming mechanism 50 has been completed, the optical axis Ax of the lamp unit 20 is made to extend in a direction which is inclined downwardly at an angle of 0.5 to 0.6° relative to the longitudinal direction of the vehicle.

Figure 2:
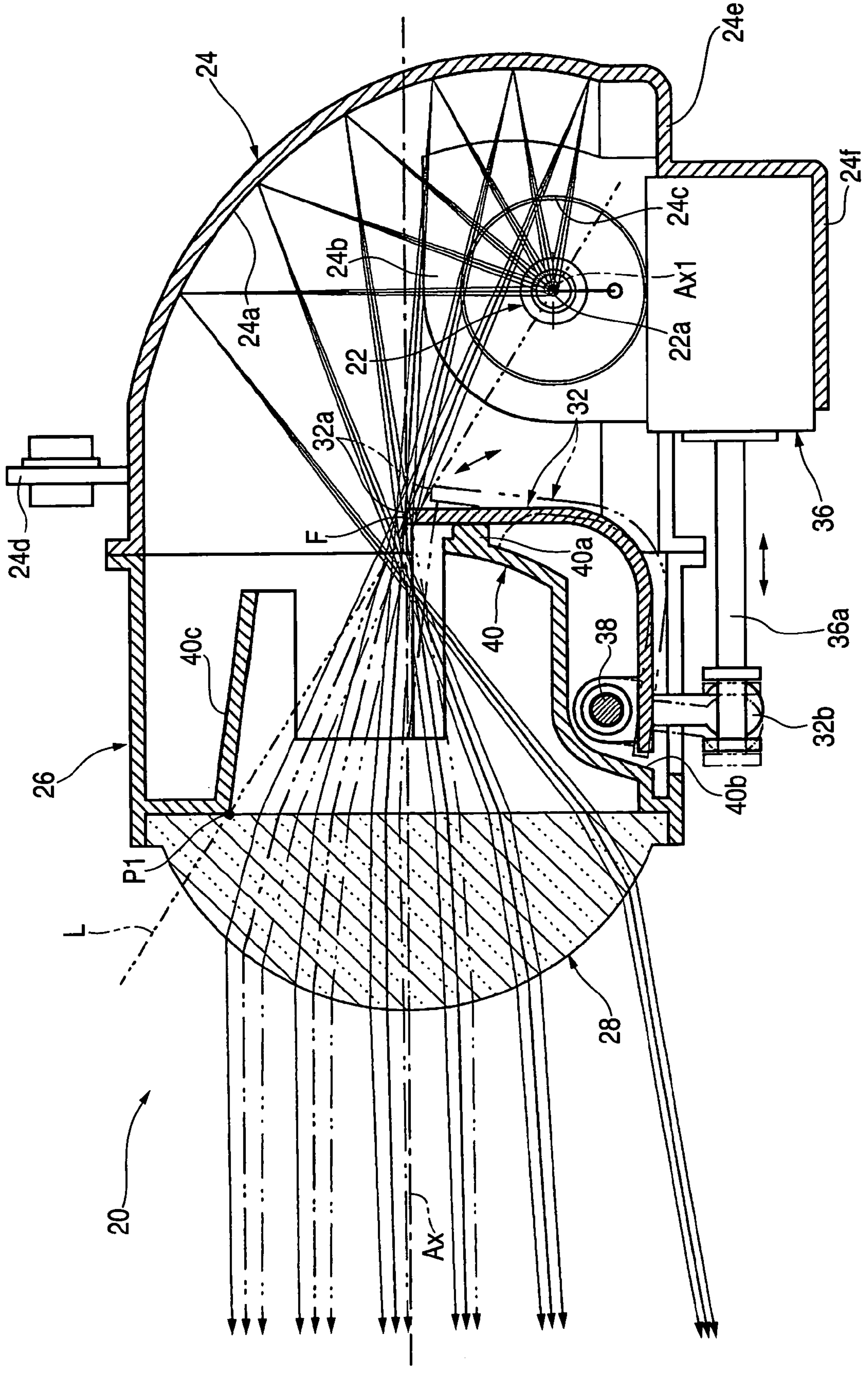
FIG. 2 is a sectional side view showing only a lamp unit itself of the vehicle headlamp without any other constituent components of the headlamp.
Figure 3:
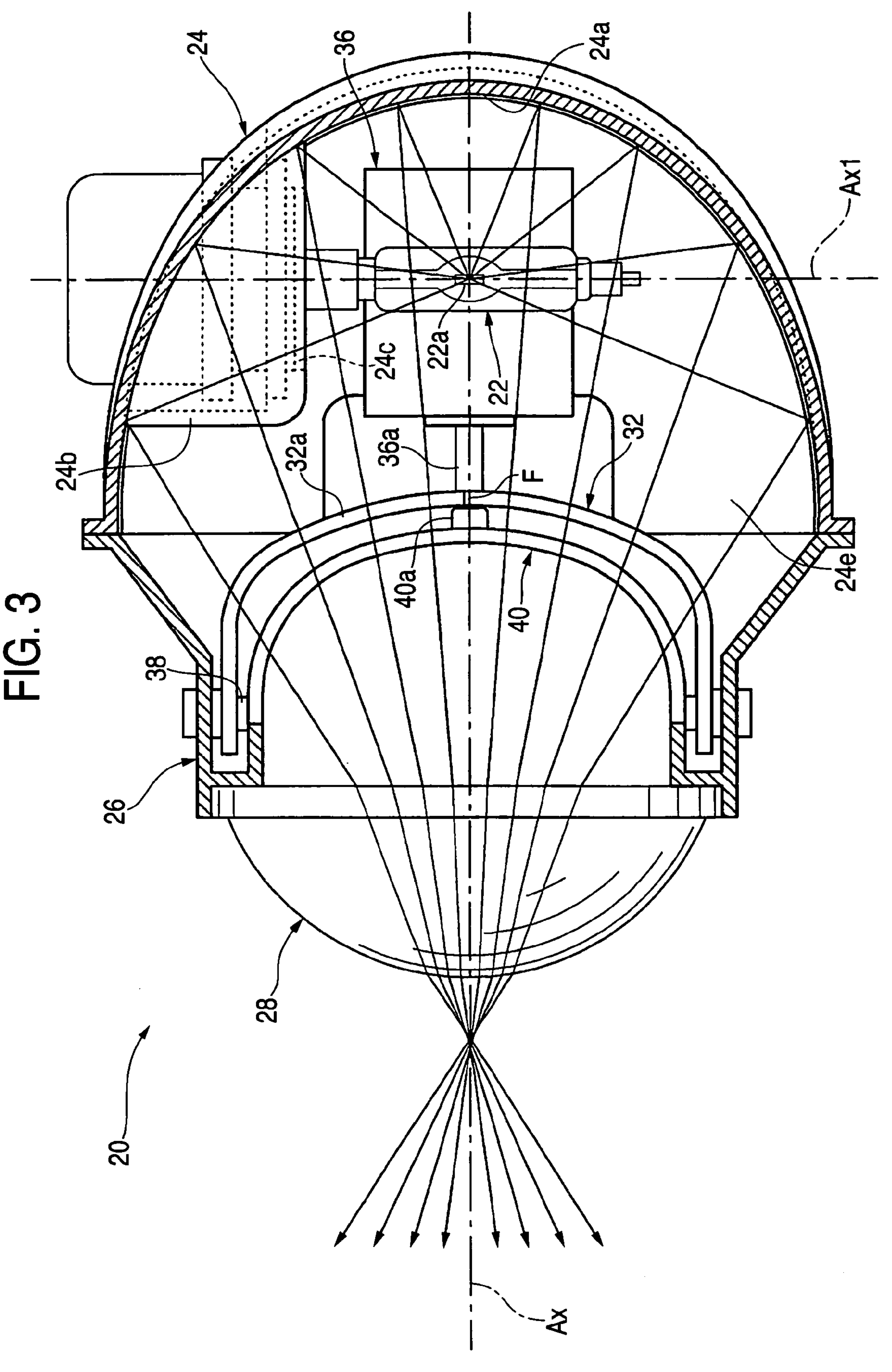
FIG. 3 is a sectional plan view showing only the lamp unit itself without any other constituent components of the headlamp.

FIGS. 2 and 3 are a sectional side view and a sectional plan view which show only the lamp unit 20 itself without any other constituent component of the headlamp.

As shown in these drawings, the lamp unit 20 is a projector type lamp unit and includes a light source bulb 22, a reflector 24, a holder 26, a projection lens 28, a movable shade 32, and a shade driving actuator 36.

The projection lens 28 is made up of a planoconvex lens in which a front surface is convex and a rear surface is plane and is disposed on the optical axis Ax. Then, this projection lens 28 is such as to project forward an image on a focal plane including a rear focal point F of the projection lens 28 as an inverted image. The projection lens 28 is made up of a synthetic resin lens formed of acrylic resin or polycarbonate resin.

The light source bulb 22 is a discharge bulb such as a metal halide bulb in which a discharged light emitting portion functions as a light source 22*a*, and the light source 22*a* is made as a linear light source which extends in a direction of a bulb center axis Ax1. Then, the light source bulb 22 is inserted into the reflector 24 from a right side of the optical axis Ax at a position which is rearward of the rear focal point F of the projection lens 28 and is apart downwardly from the optical axis Ax (for example, a position apart downwardly on the order of 20 mm from the optical axis Ax) so as to be fixed in place in the reflector 24. This insertion and fixing of the light source bulb 22 is implemented in such a manner that a light emitting center of the light source 22*a* is positioned perpendicularly below the optical axis Ax in a state where the bulb center axis Ax1 is set to extend in a horizontal direction within a vertical plane which intersects with the optical axis Ax at right angles.

The reflector 24 has a reflecting surface 24*a* which reflects light from the light source 22*a* forward in such a manner as to converge towards the optical axis Ax. This reflecting surface 24*a* has a substantially oval section, and the eccentricity thereof is set to gradually increase from a vertical sectional plane to a horizontal sectional plane. Then, from this configuration, light from the light source 22*a* which has been reflected on the reflecting surface 24*a* is made to substantially converge towards the vicinity of the rear focal point F within the vertical section, and a converging point of the reflected light is moved forward considerably within the horizontal section.

A bulb inserting and fixing portion 24*b* is formed on a lower right-hand side area of the reflecting surface 24*a* of the reflector 24 in such a manner as to protrude from the reflecting surface 24*a*, and a bulb inserting hole 24*c* is formed in a left side portion of the bulb inserting and fixing portion 24*b*. Then, this reflector 24 is supported on the lamp body 12 at aiming brackets which are formed at three locations thereon via the aiming mechanism 50.

The holder 26 is formed substantially into a cylindrical shape which extends forward from a front end opening in the reflector 24 in such a manner as to be fixedly supported on the reflector 24 at a rear end portion thereof while fixedly supporting the projection lens 28 at a front end portion thereof.

The movable shade 32 is provided in an interior space of the holder 26 in such a manner as to occupy substantially a lower half portion of the space and is rotatably supported on the holder 26 via a rotational pin 38 which extends transversely. Then, the movable shade 32 is made to take a light shielding position indicated in solid lines in FIG. 1 and a light shielding moderating position which is rotated through a predetermined angle from the light shielding position to the rear and which is indicated by double-dashed lines in the same drawing. An upper edge 32*a* of the movable shade 32 is formed in such a manner as to be stepped or staggered transversely and is made to extend substantially in arc-like fashion in a horizontal direction along the a rear focal plane of the projection lens 28 when the movable shade 32 is located at the light shielding position.

A stationary shade 40 is formed integrally with the holder 26 in front of the movable shade 32 so as to prevent the entry of stray light reflected on the reflector 24 into the projection lens 28. There are formed on the stationary shade 40 a positioning abutment portion 40*a* adapted to be brought into abutment with the movable shade 32 when the movable shade 32 has moved to the light shielding position so as to fix the movable shade 32 to the light shielding position and a positioning abutment portion 40*b* adapted to be brought into abutment with the movable shade 32 when the movable shade 32 has moved to the light shielding moderating position so as to fix the movable shade 32 to the light shielding moderating position.

As shown in FIG. 2, when situated at the light shielding position, the movable shade 32 is disposed such that the upper edge 32*a* thereof passes through the rear focal point F of the projection lens 28 to thereby partially shield reflected light from the reflecting surface 24*a* of the reflector 24, so that most of upwardly directed light which is otherwise emitted forward from the projection lens 28 is eliminated. On the other hand, when the movable shade 32 moves from the light shielding position to the light shielding moderating position, the upper edge 32*a* of the movable shade 32 is displaced to the rear diagonally downwardly, so that an amount of reflected light from the reflecting surface 24*a* which is shielded by the movable shade 32 is reduced. In this embodiment, the amount of reflected light from the reflecting surface 24*a* which is so shielded is set to become substantially zero when the movable shade 32 is situated at the light shielding position.

In addition, the movable shade 32 is made to intersect with a straight line L which connects the bulb center axis Ax1 with an upper edge P1 of an opening in the rear side of the projection lens 28 within the vertical sectional plane including the optical axis Ax whether the movable shade 32 is situated at the light shielding position or the light shielding moderating position, whereby the entry of direct light from the light source 22*a* into the projection lens 28 is prevented in an ensured fashion. To make this happen, the height of a front edge of an upper portion 40*c* of the stationary shade 40 is adjusted.

The shade driving actuator 36 is made up of a solenoid having an output shaft 36*a* which extends in the longitudinal direction and is fixed to a mount portion 24*f* which is formed on a bottom wall 24*e* of the reflector 24. The output shaft 36*a* of the shade driving actuator 36 is brought into engagement with a stay 32*b* which is formed in such a manner as to protrude downwardly from the movable shade 32 at a distal end portion thereof, whereby the reciprocating motion of the output shaft 36 in the longitudinal direction is transmitted as the rotational motion of the movable shade 32. Then, this shade driving actuator 36 is driven to move the out put shaft 36 thereof in the longitudinal direction when abeam changeover switch, not shown, is operated, whereby the movable shade 32 is allowed to move between the light shielding position and the light shielding moderating position.

Figure 4A:
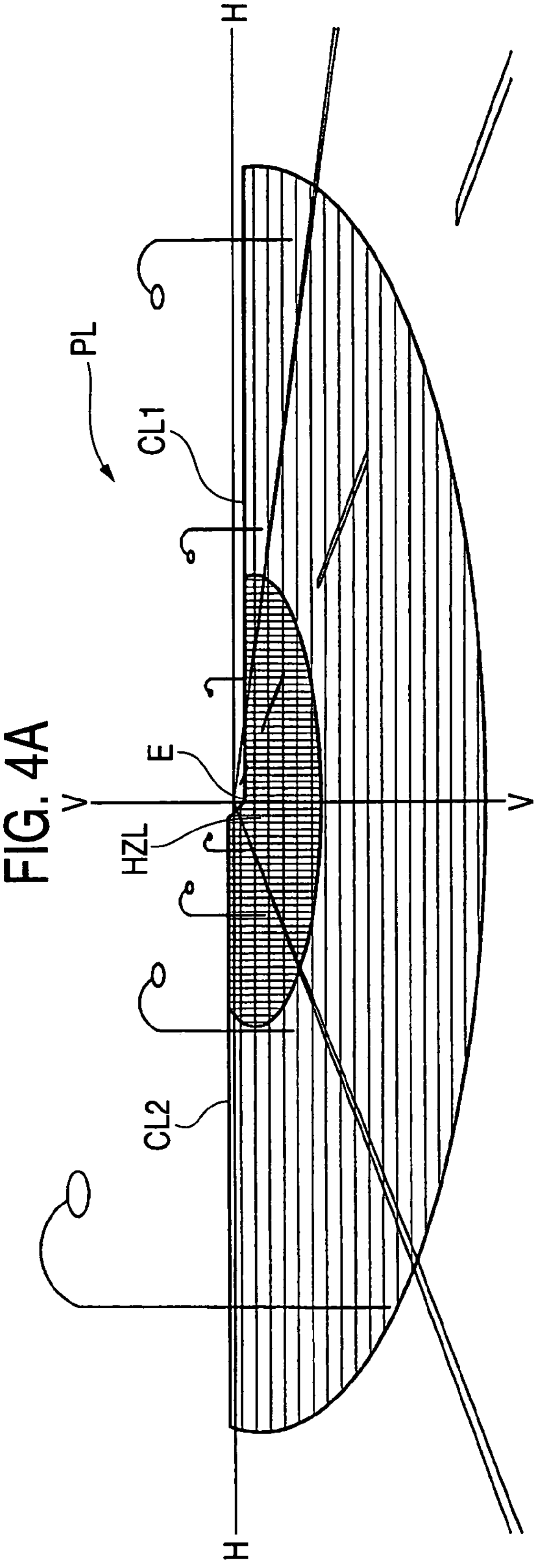
Figure 4B:
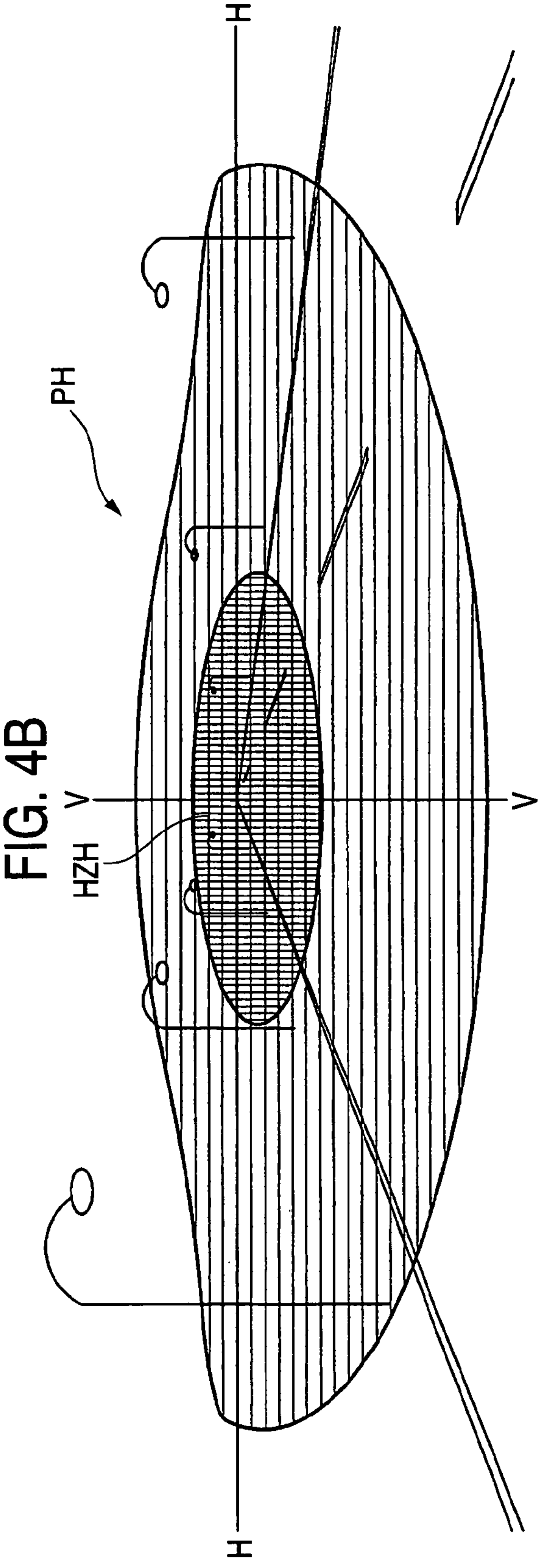

FIGS. 4A and 4B are perspective views of light distribution patterns formed on an imaginary vertical screen disposed 25 m ahead of the headlamp 10 by light emitted forward from the headlamp 10, in which FIG. 4A shows a low beam light distribution pattern and FIG. 4B shows a highbeam light distribution pattern.

The low beam light distribution pattern PL is a light distribution pattern that is formed when the movable shade 32 is situated at the light shielding position, and the high beam light distribution pattern PH is a light distribution pattern that is formed when the movable shade 32 is situated at the light shielding moderating position.

The low beam light distribution pattern PL is a low beam light distribution pattern adapted to the left-hand side traffic and has a transversely stepped or staggered cut-off line CL1, CL2 along an upper edge thereof. This cut-off line CL1, CL2 extends horizontally while be staggered transversely at a position where a line V-V passing vertically through a H-V point, a vanishing point ahead of the headlamp, forms a boundary between CL1 and CL2, and a portion of the cut-off line which is situated on a right side of the line V-V to correspond to a lane for oncoming vehicles is formed as a lower cut-off line CL1, whereas a portion of the cut-off line which is situated on a left side of the line V-V to correspond to a lane for the subject vehicle is formed as an upper cut-off line CL2 which is raised from the lower cut-off line CL1 via an inclined portion. In the low beam light distribution pattern PL, the position of an elbow point E, which is an intersection point of the lower cut-off line CL1 with the line V-V, is set at a position on the order of 0.5 to 0.6° below the H-V point, and a hot zone HZL, which is a high luminous intensity area, is formed in such a manner as to surround the elbow point E.

The low beam light distribution pattern PL is formed by projecting the image of the light source 22*a* which is formed on the rear focal plane of the projecting lens 28 by light from the light source which is reflected on the reflecting surface 24*a* of the reflector 24 on the imaginary vertical screen as an inverted projected image by the projection lens 28, and the cut-off line CL1, CL2 is formed as an inverted projected image of the upper edge 32*a* of the movable shade 32.

On the other hand, the high beam light distribution pattern PH shown in FIG. 4B is formed in such a manner as to expand, relative to the low beam light distribution pattern PL, upwardly to some extent from the cut-off line CL1, CL2 of the low beam light distribution pattern PL and has a hot zone HZH neat the H-V point.

Figure 5:
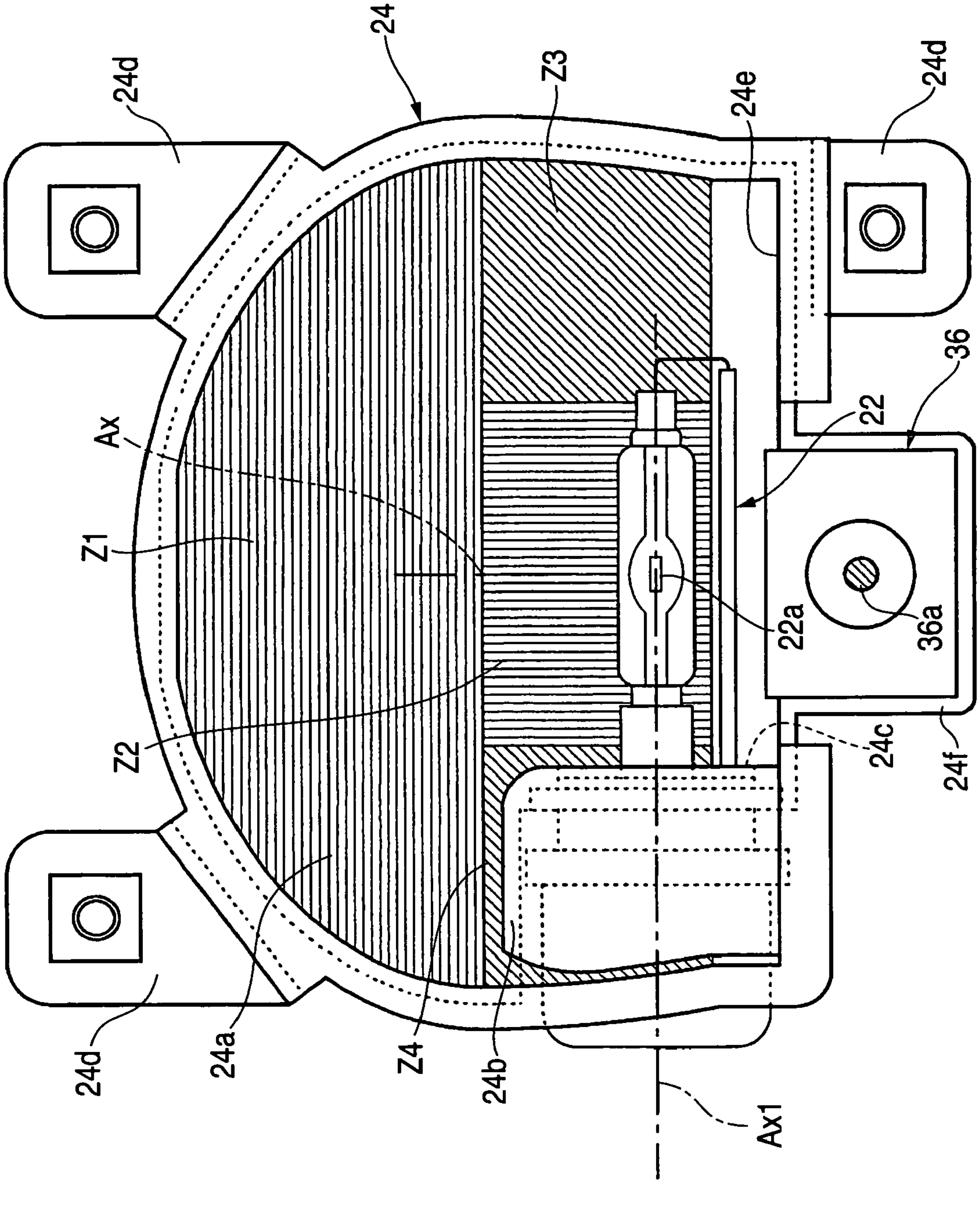
FIG. 5 is a front view showing a reflector of the lamp unit in a state where a light source bulb is inserted and fixed in place in the reflector.

FIG. 5 is a front view showing the reflector 24 of the lamp unit 20 in a state where the light source bulb 22 is inserted and fixed in place in the reflector 24.

As shown in the drawing, in the reflecting surface 24*a* of the reflector 24, an upper reflecting area Z1, which is situated on an upper side of the optical axis Ax, is set as a divergent reflecting area for forming an overall shape of the low beam light distribution pattern PL and the high beam light distribution pattern PH. In addition, in a lower reflecting area of the reflecting surface 24*a* which is situated on a lower side of the optical axis Ax thereon, a transversely central area Z2 is set as a convergent reflecting area for forming the hot zones HZL, HZH, and left- and right-side arrears Z3, Z4 which are situated on both sides of the transversely central area Z2 are set as divergent reflecting areas.

Figure 6:
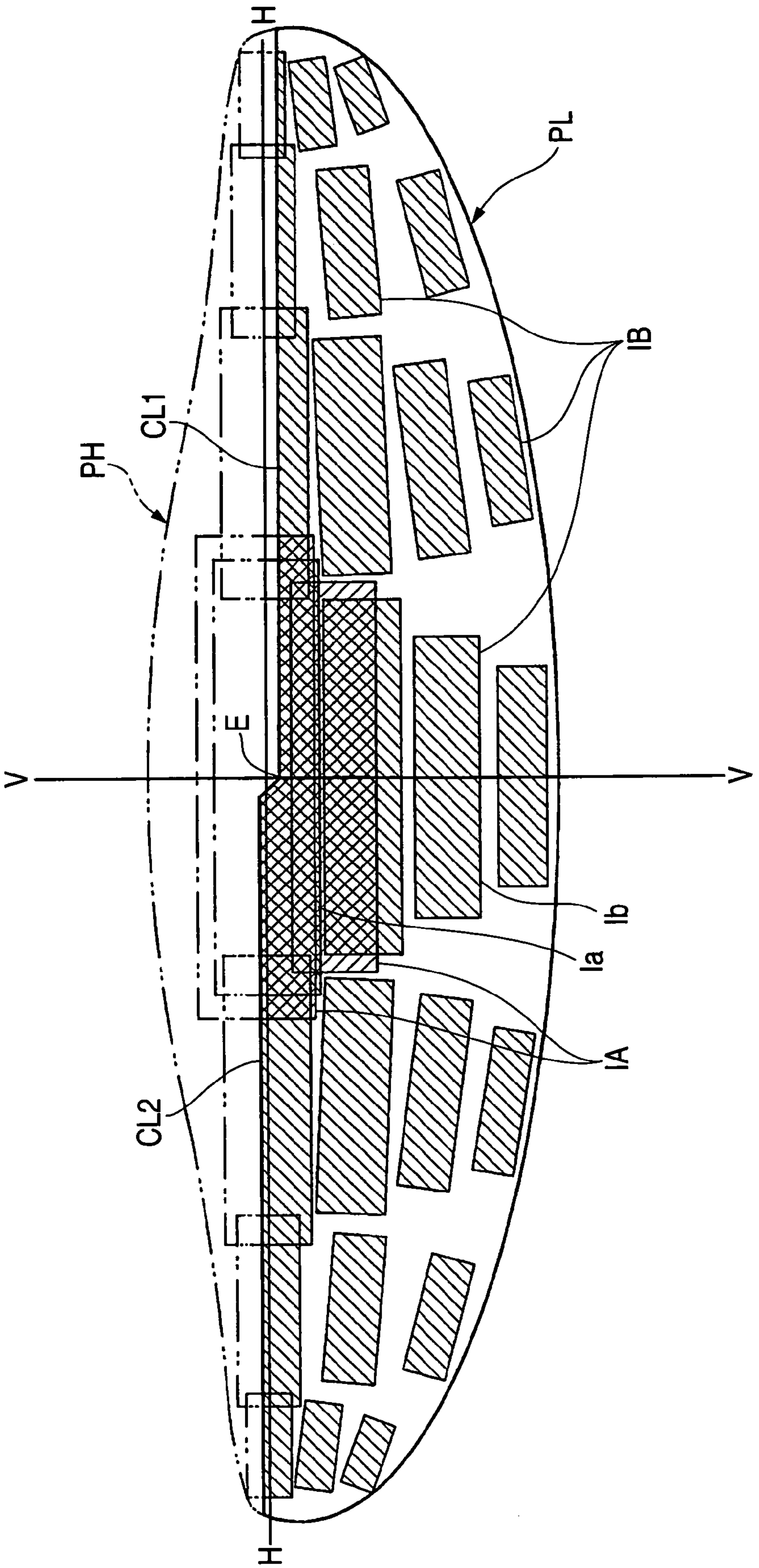
FIG. 6 is a drawing showing inverted projected images of a light source which constitute the low beam light distribution.

FIG. 6 shows inverted projected images IA, IB of the light source 22*a* which constitute the low beam light distribution pattern PL.

In the drawing, the inverted projected images IB shown as hatched with close drawn parallel lines which extend diagonally upwardly to the right are inverted projected images formed by reflected light from the upper reflecting area Z1 on the reflecting surface 24*a* of the reflector 24, and the inverted projected images IA shown as hatched with closely drawn parallel lines which extend diagonally upwardly to the left are inverted projected images formed by reflected light from the transversely central area Z2 of the lower reflecting area on the reflecting surface 24*a*.

As shown in the same drawing, these respective inverted projected images IA, IB are made as images which are formed into substantially transversely elongated rectangular shapes as the light source 22*a* is made as the linear light source which extends in the bulb center axis Ax1 direction (namely, extending in the horizontal direction within the vertical plane which intersects with the optical axis at right angles).

As this occurs, since the transversely central area Z2 of the lower reflecting area on the reflecting surface 24 is situated just behind the light source 22*a* and is relatively near the light source 22*a*, the inverted projected images IA which are formed by the reflected light from the transversely central area Z2 are formed near the elbow point E as bright and relatively large images.

On the other hand, since the upper reflecting area Z1 on the reflecting surface 24*a* is situated farther away from the light source 22*a* than the transversely central area Z2 of the lower reflecting area, the inverted projected images IB which are formed by the reflected light from the upper reflecting area Z1 become smaller images than the inverted projected images IA, but the position, size and brightness of the inverted projected images IB so formed differ depending on where to be reflected in the upper reflecting area Z1. As this occurs, as a general tendency, the inverted projected images IB which are formed by reflected light from positions on the upper reflecting area Z1 which are farther apart leftward and rightward from the optical axis Ax tend to be formed as smaller images at positions which are farther apart leftward and rightward from the elbow point E, and the inverted projected images IB which are formed by reflected light from positions on the upper reflecting area Z1 which are farther apart upwardly from the optical axis Ax tend to be formed as smaller images at positions which are farther apart from the cut-off line CL1, CL2.

Note that while the respective inverted images IA, IB resulting when the low beam light distribution pattern PL is formed in the same drawing, when forming the high beam light distribution pattern PH, since the light shielding by the movable shade 32 is cancelled, upper portions (portions indicated by double-dashed lines in the same drawing) of the respective inverted projected images IA, IB which are situated near the cut-off line CL1, CL2 are added to the low beam light distribution pattern PL, whereby the high beam light distribution pattern PH is formed.

Next, a specific process for forming the respective inverted projected images IA, IB will be described below.

Figure 7:
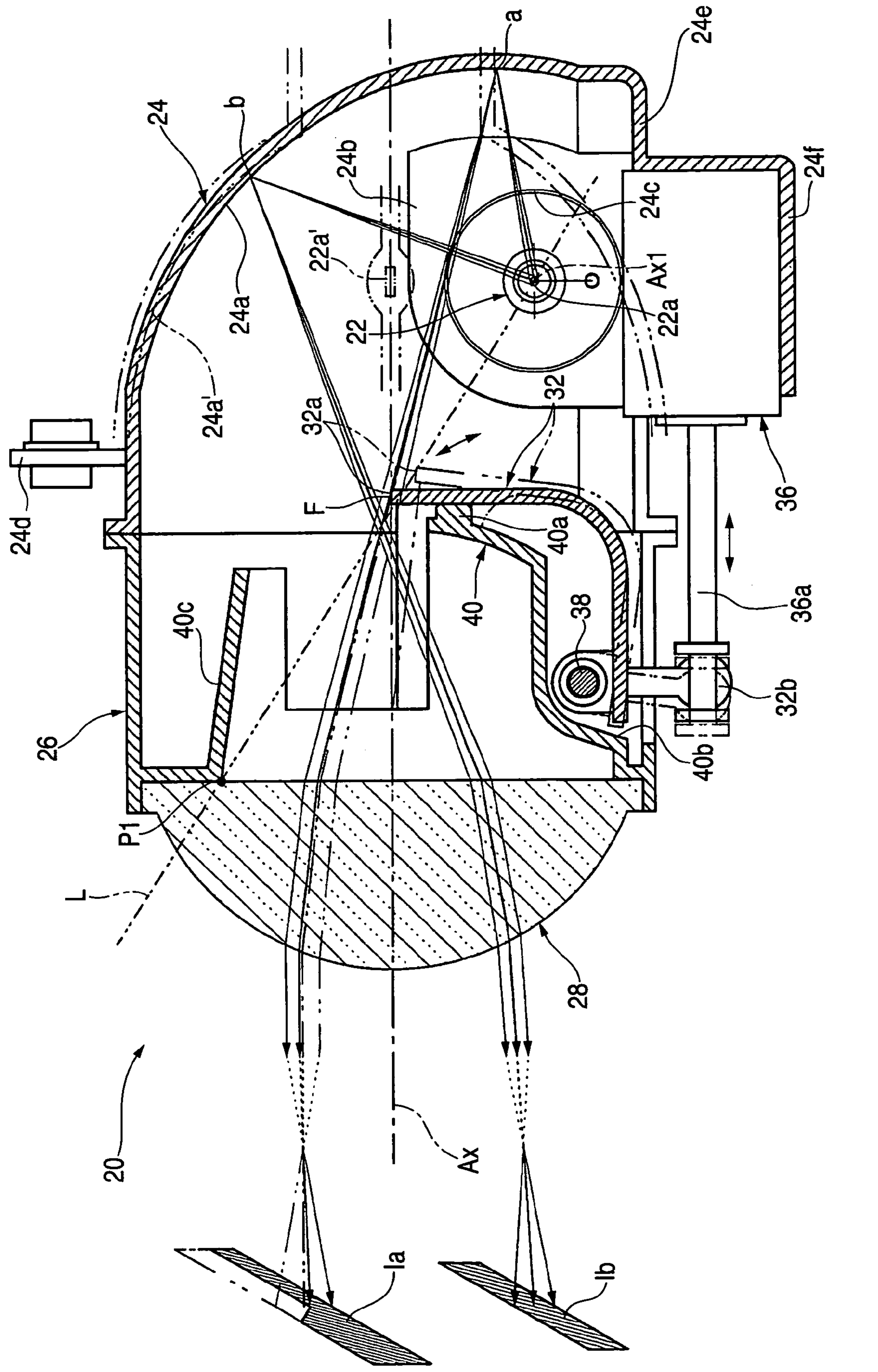
FIG. 7 is a drawing showing light paths of, light from the light source which is reflected on the reflector of the lamp unit, reflected light from two points on a reflecting surface of the reflector, as well as two inverted projected images formed by the reflected light.

FIG. 7 is a sectional side view showing light paths of, of light from the light source 22*a* which is reflected on the reflecting surface 24*a* of the reflector 24, reflected light from two points "a", "b" within the vertical sectional plane including the optical axis Ax, as well as two inverted projected images Ia, Ib which are formed by the reflected light from those two points, respectively.

Light which has been reflected at the point "a" situated slightly below the optical axis Ax on the reflecting surface 24*a* of the reflector 24 (namely, a point within the transversely central area Z2 of the lower reflecting area) passes near the upper edge 32*a* of the movable shade 32 to be incident on the projection lens 28 to thereby form an inverted projected image Ia situated in the vicinity of the elbow point E (refer to FIG. 6).

As this occurs, since the point "a" is situated relatively near the light source 22*a*, a perspective angle from the light source 22*a* relative to the point "a" takes a relatively large value, whereby the inverted projected image Ia becomes a relatively large image. In addition, since the reflected light from the point "a" is partially shielded by the movable shade 32, the inverted projected image Ia so formed is such that an upper portion of the substantially transversely elongated rectangular shape thereof is cut out along the upper edge 32*a* of the movable shade 32.

On the other hand, light which has been reflected at the point "b" situated apart upwardly from the optical axis Ax on the reflecting surface 24*a* of the reflector 24 (namely, a point within the upper reflecting area Z1) passes above the upper edge 32*a* of the movable shade 32 to be incident on the projection lens 28 to thereby form an inverted projected image Ib situated below the elbow point E (refer to FIG. 6).

As this occurs, since the point "b" is situated relatively far apart from the light source 22*a*, a perspective angle from the light source 22*a* relative to the point "b" takes a relatively small value, whereby the inverted projected image Ib becomes a relatively small image. In addition, since the reflected light from the point "b" is not shielded by the movable shade 32, the inverted projected image Ib so formed remains as the substantially transversely elongated rectangular image.

Next, the function and advantage of the invention will be described while comparing with those of the conventional example.

Figure 8:
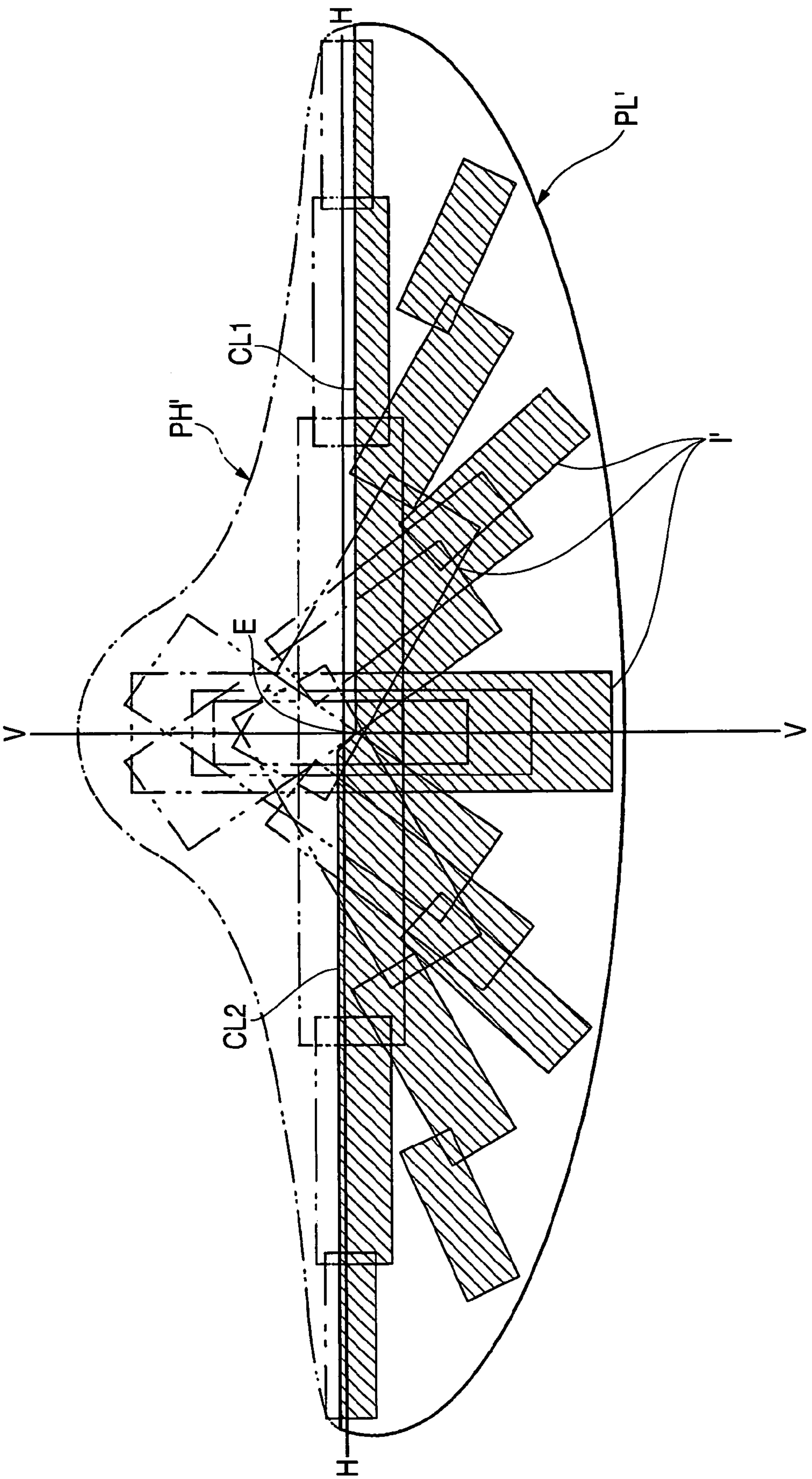
FIG. 8 is a drawing similar to FIG. 6, which shows a low beam light distribution pattern formed when a conventional lamp construction is adopted.

FIG. 8 is the same drawing as FIG. 6, which shows a low beam light distribution pattern PL' which is formed when adopting the conventional lamp construction.

This low beam light distribution pattern PL' is a light distribution pattern formed when, as shown in double-dashed lines in FIG. 7, light from a light source 22*a*' made up of a linear light source disposed in such a manner as to extend along the optical axis Ax is reflected on a reflecting surface 24*a*' constituted by an oval surface.

Inverted projected images I' of the light source 22*a*' which constitute the low beam light distribution pattern PL' become substantially rectangular images which extend radially from the elbow point E. In case the images remain as they are, the inverted projected images I' of vertically elongated rectangular shapes are such that lower portions thereof are formed as bright striped images on the road surface in front of the vehicle, whereby a large irregular light distribution is generated in the near field area of the road surface in front of the vehicle. To cope with this, therefore, the surface configuration of the reflecting surface 24*a*' needs to be adjusted so as to displace the positions where the inverted projected images I' of vertically elongated rectangular shapes are formed upwardly to some extent as shown in the same drawing.

In case such an adjustment is made, however, since the inverted projected images I' of vertically elongated rectangular shapes are formed such that considerably large portions thereof protrude upwardly from the cut-off line CL1, CL2, light that would otherwise form the upwardly protruding portions is shielded by the movable shade 32, whereby the light beam utilization factor of emergent light from the light source 22*a* is reduced by that extent.

On the other hand, while, in a high beam light distribution pattern PH' indicated in double-dashed lines in the same drawing, the shielding of the upwardly protruding portions of the inverted projected images I' which are shielded by the movable shade 32 is cancelled, upper portions of the upwardly protruding portions are used only to illuminate an upper space ahead of the vehicle and are not used effectively as light which illuminates a far field area of the road surface ahead of the vehicle.

In this regard, according to the embodiment, as shown in FIG. 6, since the inverted projected images IA, IB of the light source 22*a* are formed as the substantially transversely elongated rectangular images, in the low beam light distribution pattern PL, an amount of light shielded by the movable shade 32 can be reduced largely to a small level, whereby the light beam utilization factor of emergent light from the light source 22*a* can be increased. On the other hand, in the high beam light distribution pattern PH, by canceling the shielding of the light which is shielded by the movable shade 32, the light so released can be used effectively as light for illuminating the far field area of the road surface ahead of the vehicle.

Moreover, according to the embodiment, even in the event that the positions where the inverted projected images IA, IB are formed are displaced downwardly as required, since the inverted projected images IA, IB are formed as the substantially transversely elongated rectangular images, there is no case where a large irregular light distribution is generated in the near field area of the road surface in front of the vehicle.

As has been described in detail heretofore, since the vehicle headlamp 10 according to the embodiment has the movable shade 32 which can move between the light shielding position and the light shielding moderating position, the single headlamp can be used both for low beam and high beam. In addition, while the vehicle headlamp 10 according to the embodiment is made as the projector type vehicle headlamp, since the light source bulb 22 is inserted into the reflector 24 from the side of the optical axis Ax which extends in the longitudinal direction of the vehicle so as to be fixed in place therein, the longitudinal length of the headlamp can be shortened so as to attempt to make the headlamp compact in size.

As this occurs, since the insertion and fixing of the light source bulb 22 is performed at the position apart downwardly from the optical axis Ax, it is possible to avoid the formation of the light source bulb 22 inserting and fixing hole in the optical axis sideways area on the reflecting surface 24*a* of the reflector 24, whereby the optical axis sideways area can be used effectively to control the light distribution. In addition, since the light source 22*a* is situated below the optical axis Ax, it can be made difficult that light from the light source 22*a* which is reflected at areas on the reflecting surface 24*a* of the reflector 24 which are in the vicinity of the optical axis Ax is shielded by the light source bulb 22. Consequently, the diverging area of the light distribution pattern can be formed by reflected light from the optical axis sideways areas on the reflecting surface 24*a* of the reflector 24 both in the low beam light distribution pattern and the high beam light distribution pattern, whereby sufficient brightness can be ensured for the diverging area.

Thus, according to the invention, in the projector type vehicle headlamp having the movable shade, even in the event that the sideways insertion type lamp construction is adopted, sufficient brightness can be ensured for the diverging area of the light distribution pattern.

Moreover, in the vehicle headlamp 10 according to the embodiment, since the light source 22*a* is made as the linear light source which extends in the bulb center axis Ax1 direction of the light source bulb 22, the inverted projected image IA of the light source 22*a* that is formed by reflected light from the transversely central area Z2 of the lower reflecting area of the reflecting surface 24*a* of the reflector 24 which is suitable for forming the hot zones HZL, HZH becomes the substantially transversely elongated rectangular images. Consequently, by forming the hot zones HZL, HZH by the inverted projected images IA, the hot zones HZL, HZH can be made sufficiently bright without generating a large irregular light distribution on the road surface in front of the vehicle by the inverted projected images IA.

In addition, according to the embodiment, since the light source 22*a* is situated below the optical axis Ax, and the movable shade 32 is disposed such that the upper edge 32*a* thereof is positioned in the vicinity of the optical axis Ax near the rear focal point F of the projection lens 28 when located at the light shielding position, it is possible to prevent most of the direct light from the light source 22*a* from entering the projection lens 28.

In particular, according to the embodiment since the movable shade 32 is made to intersect with the straight line L which connects the light source 22*a* with the upper edge P1 of the opening in the rear side of the projection lens 28 whether the movable shade 32 is located at the light shielding position or the light shielding moderating position, it can be ensured that the direct light from the light source 22*a* is prevented from entering the projection lens 28, whereby the light distribution control for forming the low beam light distribution pattern and the high beam light distribution pattern can be implemented with good accuracy.

As this occurs, according to the embodiment, since the downward displacement of the bulb center axis Ax1 relative to the optical axis Ax is set to the relatively large value of on the order of 20 mm, it is possible to prevent the shielding of the light from the light source bulb 22 which is reflected on the optical axis sideways areas on the reflecting surface 24*a* of the reflector 24 by the light source bulb 22.

In addition, according to the embodiment, since the upper reflecting area Z1 of the reflecting surface 24*a* of the reflector 24 is set as the reflecting area for forming the diverging light distribution pattern, the sufficient leftward and rightward transverse divergent angles can be given to the low beam light distribution pattern and the high beam light distribution pattern. On the other hand, since the transversely central area Z2 of the lower reflecting area where the incident luminous flux of the light source bulb 22 on the reflecting area 24*a* of the reflector 24 takes a large value is set as the reflecting area for forming the converging light distribution pattern, the formation of the hot zones HZL, HZH of the low beam light distribution pattern PL and the high beam light distribution pattern PH can be facilitated.

Furthermore, according to the embodiment, since the projection lens 28 is made up of the synthetic resin lens, the projection lens can be attempted to be made light in weight and inexpensive in cost when compared with a case where the projection lens is made of glass.

As this occurs, according to the invention, since the direct light from the light source 22*a* is made not to be incident on the projection lens 28 whether the movable shade 32 is situated at the light shielding position or at the light shielding moderating position, the increase in the temperature of the projection lens 28 by radiation heat from the light source 22*a* can be suppressed effectively. Moreover, since the light source 22*a* is made as the linear light source which extends in the bulb center axis Ax1 direction, the positions where reflected light from respective points on the reflecting surface 24*a* of the reflector 24 is incident on the projection lens 28 within the vertical sectional plane including the optical axis Ax can easily be caused to deviate vertically from one another so that the points do not overlap one another, whereby a local increase in the temperature of the projection lens 28 can be prevented. Consequently, even in the event that the projection lens 28 is made up of the synthetic resin lens, an easy thermal deformation of the projection lens 28 can prevented.

Next, a modification to the embodiment will be described below.

Figure 9:
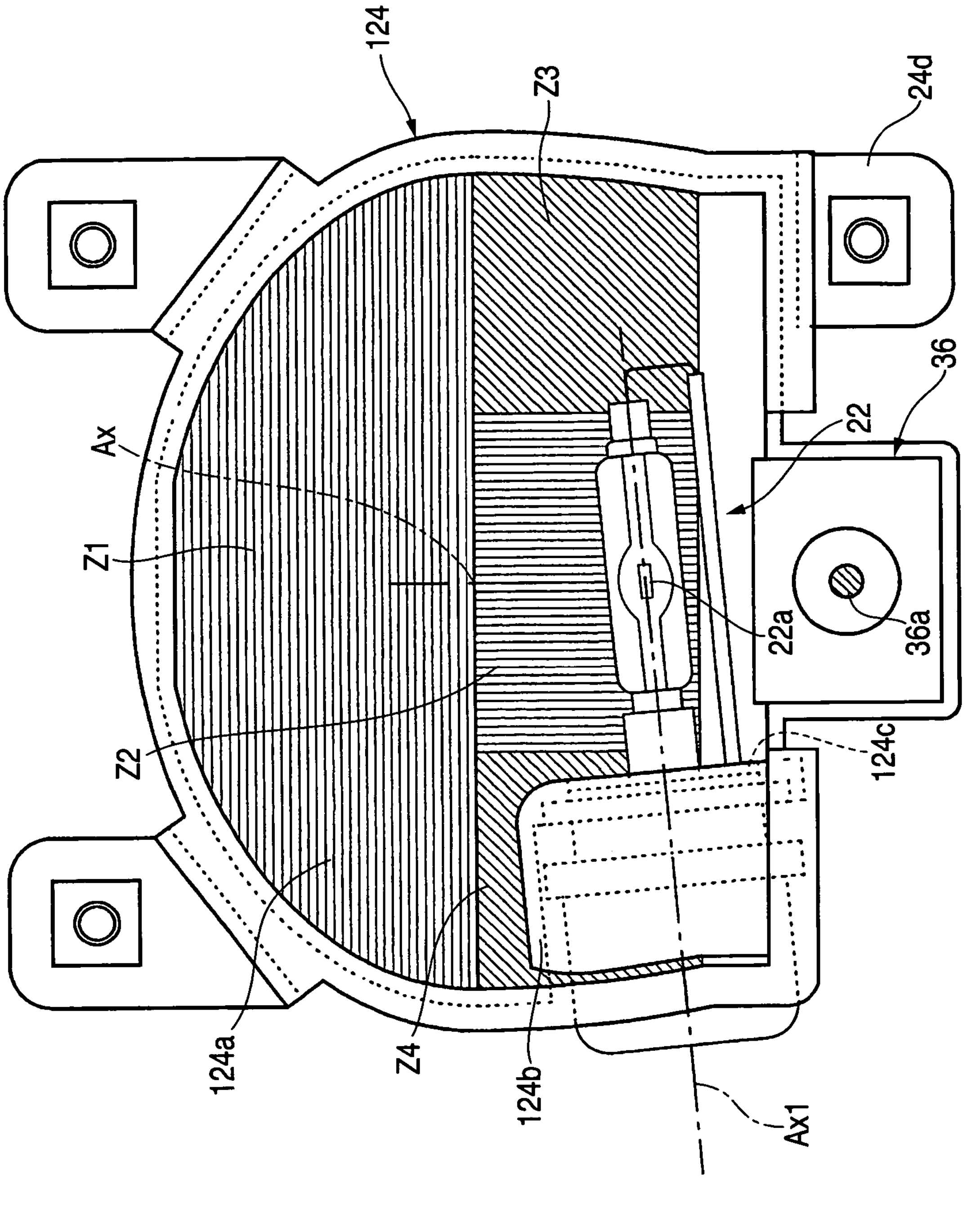
FIG. 9 is a drawing similar to FIG. 5, which shows a modification made to the embodiment.

FIG. 9 is a front view showing a reflector 124 according to the modification in a state in which the light source bulb 22 is inserted and fixed in place therein.

The reflector 124 according to the modification is similar to the reflector 24 described in the embodiment above as to the basic construction but is different as to the inserting and fixing angle of the light source bulb 22.

Namely, while, in the embodiment, the insertion and fixing of the light source bulb 22 relative to the reflector 24 is implemented with the bulb center axis Ax1 being disposed in the horizontal direction, in the modification, the insertion and fixing of the light source bulb 22 relative to the reflector 124 is implemented with the bulb center axis Ax1 of the light source bulb 22 being inclined upwardly at an angle of 5° relative to the horizontal direction. As this occurs, the light emitting portion 22*a* is, as with the embodiment, set so as to be positioned on the order of 20 mm perpendicularly downward from the optical axis Ax.

By adopting the construction according to the modification, since the positions of a light source bulb 22 inserting and fixing hole 124*c* that is formed in a reflecting surface 124*a* of the reflector 124 and a bulb inserting and fixing portion 124*b* can be lowered, optical axis sideways areas on the reflecting surface 124*a* can be used widely to control the light distribution.

Note that while, in the modification, the upward inclination angle of the light source bulb 22 is set to 5°, it goes without saying that the relevant angle may be set to any other angular values than the aforesaid value. However, the light source bulb 22 is a discharge bulb and hence since, in case the bulb center axis Ax1 is inclined largely relative to the horizontal direction, discharged light emission becomes difficult to be performed properly, it is preferable that the upward inclination angle is set to a value of on the order of 15° or smaller.

Also by setting the bulb center axis Ax1 of the light source bulb 22 so as to be inclined forward, instead of setting the same axis so as to be inclined upwardly, the optical axis sideways areas on the reflecting surface 124*a* can be used widely to control the light distribution. As this occurs, in case the bulb center axis Ax1 of the light source bulb 22 is set so as to be inclined upwardly, as well as being inclined forward, the optical axis sideways areas on the reflecting surface 124*a* can be used more widely to control the light distribution.

While, in the embodiment and the modification, the light source bulb 22 is described as being inserted into the reflector 24, 124 from the right side of the optical axis Ax so as to be fixed in place therein, even in the event that the light source bulb 22 is inserted into the reflector 24, 124 from the left side of the optical axis Ax so as to be fixed in place therein, by adopting the constructions of the embodiment and the modification, a similar function and advantage to those obtained by the embodiment and the modification can be obtained.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. A vehicle headlamp comprising:

a projection lens disposed on an optical axis extending in a longitudinal direction of a vehicle;

a light source disposed rearward of a rear focal point of the projection lens;

a reflector for reflecting light from the light source so as to converge towards the optical axis; and a shade for partially shielding the light from the reflector, wherein the shade is movable between a light shielding position where an upper edge of the shade is positioned in a vicinity of the optical axis near the rear focal point and a light shielding moderating position where a shielding amount of the light shielded by the shade is smaller than when the shade is at the light shielding position, wherein the light source comprises a light emitting portion of a light source bulb, the light source is inserted into the reflector from a side of the optical axis and fixed to the reflector, and the light source is positioned below the optical axis.

2. The vehicle headlamp according to claim 1, wherein the light source is comprises a linear light source extending in a bulb center axis direction of the light source bulb.

3. The vehicle headlamp according to claim 1, wherein the shade intersects with a straight line connecting the light source with an upper edge of an opening in a rear side of the projection lens both when the shade is located at the light shielding position and when the shade is located at the light shielding moderating position.

4. The vehicle headlamp according to claim 1, wherein a downward displacement of the light source from the optical axis is set to a value equal to or larger than 10 mm.

5. The vehicle headlamp according to claim 1, wherein an upper reflecting area of a reflecting surface of the reflector comprises a reflecting area for forming a diverging light distribution pattern, and a transversely central area of a lower reflecting area of the reflecting surface comprises a reflecting area for forming a converging light distribution pattern.

6. The vehicle headlamp according to claim 1, wherein a bulb center axis direction of the light source bulb is inclined upwardly at an angle relative to a horizontal direction.

7. The vehicle headlamp according to claim 1, wherein the projection lens comprises a synthetic resin lens.

* * * * *